United States Patent
Inagaki et al.

(10) Patent No.: US 9,458,777 B2
(45) Date of Patent: Oct. 4, 2016

(54) METHOD FOR SETTING SENSOR OUTPUT

(71) Applicant: DENSO CORPORATION, Kariya, Aichi-pref. (JP)

(72) Inventors: Noriyuki Inagaki, Obu (JP); Shinsuke Miyazaki, Chiryu (JP); Koji Hashimoto, Anjo (JP); Yuichiro Moritani, Kariya (JP)

(73) Assignee: DENSO CORPORATION, Kariya (JP)

( * ) Notice: Subject to any disclaimer, the term of this patent is extended or adjusted under 35 U.S.C. 154(b) by 298 days.

(21) Appl. No.: 14/074,827

(22) Filed: Nov. 8, 2013

(65) Prior Publication Data
US 2014/0202436 A1     Jul. 24, 2014

(30) Foreign Application Priority Data

Jan. 18, 2013 (JP) .................................. 2013-7075

(51) Int. Cl.
*F02D 41/00* (2006.01)
*F02D 41/24* (2006.01)

(52) U.S. Cl.
CPC ....... *F02D 41/0065* (2013.01); *F02D 41/0077* (2013.01); *F02D 41/2464* (2013.01); *F02D 41/2477* (2013.01); *F02M 26/48* (2016.02); *F02M 26/64* (2016.02); *F02D 2250/16* (2013.01); *F02M 26/05* (2016.02); *F02M 26/06* (2016.02); *F02M 26/21* (2016.02); *F02M 26/25* (2016.02); *Y02T 10/47* (2013.01)

(58) Field of Classification Search
CPC ...... F02B 37/225; F02D 9/105; F02D 41/00; F02D 41/0065; F02D 41/0077; F02D 2200/0404; F02D 2250/16; F02M 27/07; F02M 27/0707; F02M 27/0724; F02M 27/0756; F02M 27/0786
USPC .......... 123/319, 336, 339.12, 350, 363, 376, 123/568.17–568.21, 568.23, 568.24
See application file for complete search history.

(56) References Cited

U.S. PATENT DOCUMENTS

| | | | | |
|---|---|---|---|---|
| 4,989,147 | A * | 1/1991 | Ishii | F16H 61/0021 477/163 |
| 5,508,926 | A * | 4/1996 | Wade | F02D 41/221 123/568.16 |
| 6,073,610 | A * | 6/2000 | Matsumoto | F02D 11/107 123/396 |
| 7,163,005 | B2 * | 1/2007 | Tussing | F02B 33/44 123/563 |
| 7,222,605 | B2 * | 5/2007 | Kusatsugu | F02D 9/02 123/399 |
| 7,234,444 | B2 * | 6/2007 | Nanba | F02D 9/1045 123/337 |
| 2004/0007221 | A1 * | 1/2004 | McConnell | F02M 25/0772 123/568.21 |
| 2008/0209887 | A1 * | 9/2008 | Hanari | F02B 39/16 60/277 |
| 2009/0250042 | A1 * | 10/2009 | Sujan | F02B 47/08 123/568.21 |

(Continued)

FOREIGN PATENT DOCUMENTS

JP     2011-032929 A     2/2011

*Primary Examiner* — John Kwon
*Assistant Examiner* — Johnny H Hoang

(57) ABSTRACT

A valve is configured to control an opening in a passage. A valve angle sensor is configured to send an electric signal according to a rotation angle of the valve. In a storing process, an actual measurement value of a valve angle at a mechanical full open position is stored as an actual full open valve angle. In a first setting process, a first output value at a mechanical full close position is set. In a second setting process, a second output value at the stored actual full open valve angle is set. The output characteristic is set as an angle to output value relation according to the first output value and the second output value.

13 Claims, 5 Drawing Sheets

(56) References Cited

U.S. PATENT DOCUMENTS

| | | | |
|---|---|---|---|
| 2010/0011597 A1* | 1/2010 | Bo | F02D 31/007 30/381 |
| 2010/0089370 A1* | 4/2010 | Furukawa | F02M 25/0729 123/568.12 |
| 2011/0023846 A1 | 2/2011 | Miyazaki et al. | |
| 2012/0145134 A1* | 6/2012 | Miyazaki | F02D 9/1065 123/568.2 |
| 2013/0104859 A1* | 5/2013 | Miyazaki | F02D 41/0077 123/568.21 |

* cited by examiner

METHOD FOR SETTING SENSOR OUTPUT

CROSS REFERENCE TO RELATED APPLICATION

This application is based on reference Japanese Patent Application No. 2013-7075 filed on Jan. 18, 2013, the disclosure of which is incorporated herein by reference.

TECHNICAL FIELD

The present disclosure relates to a method for setting a sensor output characteristic of a valve angle sensor, which is for detecting an angle of a valve, which is to control an opening area of a passage. For example, the present disclosure relates to a method for setting a sensor output of a valve angle sensor, which is for detecting an angle of a low-pressure EGR valve equipped to an internal combustion engine, which is equipped with a turbocharger in an intake and exhaust system.

BACKGROUND

For example, Patent Document 1 discloses a valve device equipped to an internal combustion engine, which is equipped with a turbocharger in an intake and exhaust system. The valve device of Patent Document 1 includes a low-pressure EGR valve and a valve angle sensor. The low-pressure EGR valve opens and closes a low-pressure EGR passage. The valve angle sensor sends an electric signal according to an angle of the low-pressure EGR valve.

A conventional method for setting an output characteristic of a valve angle sensor employs following processes. Specifically, an output value at the mechanical full close position, which is a full close position in a mechanical configuration, is set. Further, an output value at the mechanical full open position, which is a full open position in a mechanical configuration, is set. The output characteristic is obtained as an angle to output value relation, which is linearly interpolated.

More specifically, a value is written in the valve angle sensor, such that the valve angle sensor outputs a predetermined voltage Vc at the mechanical full close position. In addition, a value is written in the valve angle sensor, such that the valve angle sensor outputs a predetermined voltage Vo at the mechanical full open position.

(Patent Document 1)
Publication of Unexamined Japanese Patent Application No. 2011-32929

In general, a rotation angle (actual angle) of a valve at the mechanical full open position may vary for each product. Therefore, in the conventional method, an output characteristic of a valve angle sensor may vary for each product. Details will be described with reference to FIG. 7.

For example, it is supposed that the actual angle is ideally 0 deg at the mechanical full close position, and the actual angle is ideally $\theta o$ at the mechanical full open position. Nevertheless, in reality, the actual angle varies from the supposed angle at the mechanical full close position or at the mechanical full open position, due to a dimensional error and/or the like. In the present assumption, for a product A, the actual angle is $\theta a$, which is less than $\theta o$, at the mechanical full open position. In addition, for a product B, the actual angle is $\theta b$, which is greater than $\theta o$, at the mechanical full open position.

In this case, when the value is written in the valve angle sensor, such that the output value at the mechanical full open position becomes Vo uniformly, the output characteristics of both the product A and the product B are away from the ideal characteristic, as shown in FIG. 7. Accordingly, an output characteristic may vary for each product.

SUMMARY

It is an object of the present disclosure to produce a method for setting an output characteristic of a valve angle sensor, which enables to suppress variation in an output characteristic for each product.

According to an aspect of the present disclosure, a method is for setting an output characteristic of a valve angle sensor of a valve device. The valve device includes a valve and the valve angle sensor. The valve is configured to control an opening in a passage. The valve angle sensor is configured to send an electric signal according to a rotation angle of the valve. The method comprises storing, in a storing process, an actual measurement value of a valve angle in a mechanical full open position, which is a full open position in a mechanical configuration, as an actual full open valve angle. The method further comprises setting, in a first setting process, an output value in a mechanical full close position, which is a full close position in the mechanical configuration. The method further comprises setting, in a second setting process, an output value at the actual full open valve angle, which is stored in the storing process. The output characteristic is set as an angle to output value relation according to the output value, which is set in the first setting process, and the output value, which is set in the second setting process.

According to an aspect of the present disclosure, a method is for setting an output characteristic of a valve angle sensor. The valve angle sensor is configured to send an electric signal according to a rotation angle of a valve. The valve is rotatable to control an opening in a passage. The method comprises storing, as an actual full open valve angle, an actual measurement value of the rotation angle when the valve is in a mechanical full open position, the mechanical full open position being a full open position of the valve in a mechanical configuration of the valve. The method further comprises first setting a first output value of the valve angle sensor when the valve is in a mechanical full close position, the mechanical full close position being a full close position of the valve in the mechanical configuration. The method further comprises second setting a second output value of the valve angle sensor when the valve at the actual full open valve angle, which is stored. The output characteristic is set as an angle to output value relation according to the first output value and the second output value.

The wordings of first and second do not limit an order of the setting procedures.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
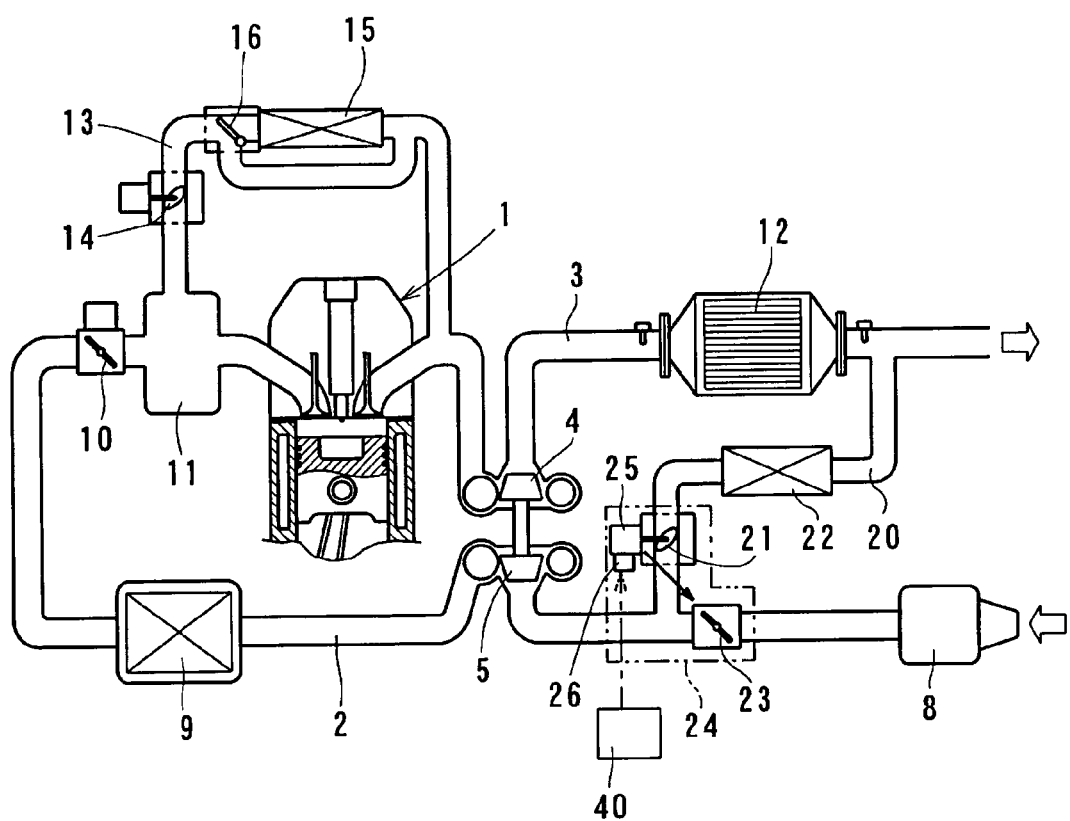
FIG. 1 is a schematic view showing an intake and exhaust system for an internal combustion engine, according to an embodiment of the present disclosure.

As follows, embodiments of the present disclosure will be described in detail.

Embodiment

The embodiment will be described with reference to FIGS. 1 to 6. First, an intake and exhaust system for an internal combustion engine will be described with reference to FIG. 1. A method for setting a sensor output according to the present embodiment is employed in the intake and exhaust system. The intake and exhaust system includes an intake passage 2, an exhaust passage 3, a turbocharger, a high-pressure EGR device, and low-pressure EGR device. The intake passage 2 conducts intake air to the engine 1. The exhaust passage 3 discharges exhaust gas from the engine 1. The turbocharger includes an exhaust turbine 4 and a compressor 5. The exhaust turbine 4 is equipped in the exhaust passage 3. The compressor 5 is equipped in the intake passage 2. The high-pressure EGR device and the low-pressure EGR device recirculate a part of exhaust gas into the intake passage 2.

The intake passage 2 is equipped with an air cleaner 8, the compressor 5 of the turbocharger, an intercooler 9, a throttle valve 10, a surge tank 11, and the like, in this order from the upstream side of intake air. The air cleaner 8 removes foreign matter contained in intake air. The intercooler 9 cools intake air pressurized in the compressor 5. The throttle valve 10 controls an amount of intake air flow. The surge tank 11 forms a chamber having a predetermined volume.

The exhaust passage 3 is equipped with the exhaust turbine 4 of the turbocharger, a diesel particulate filter (DPF) 12, and the like, in this order from the upstream side of exhaust gas. The DPF 12 captures particulate matter (PM) contained in exhaust gas.

The exhaust turbine 4 is configured to convert energy of exhaust gas into a torque. The compressor 5 is coaxially connected with the exhaust turbine 4 and driven by application of the torque converted by the exhaust turbine 4 thereby to pressurize intake air.

The high-pressure EGR device receives exhaust gas, which is at relatively high pressure and high temperature, immediately after the engine 1 discharges the exhaust gas. The high-pressure EGR device recirculates, as high-pressure EGR gas, a part of the exhaust gas into the intake passage 2. The high-pressure EGR device includes the exhaust passage 3 located on the upstream side of exhaust gas from the exhaust turbine 4, a high-pressure EGR passage 13, a high-pressure EGR valve 14, a high-pressure EGR cooler 15, and a switching valve 16. The high-pressure EGR passage 13 connects the intake passage 2 on the downstream side of intake air from the throttle valve 10. The high-pressure EGR valve 14 controls a flow quantity of high-pressure EGR gas passing through the high-pressure EGR passage 13. The high-pressure EGR cooler 15 cools high-pressure EGR gas. The switching valve 16 switches between a path, which passes through the high-pressure EGR cooler 15, and a path, which bypasses the high-pressure EGR cooler 15.

The low-pressure EGR device receives exhaust gas, which is at relatively low pressure and relatively low temperature. The low-pressure EGR device refluxes, as low-pressure EGR gas, a part of the exhaust gas into the intake passage 2. The low-pressure EGR device includes a low-pressure EGR passage 20, a low-pressure EGR valve 21, a low-pressure EGR cooler 22, and a throttle valve 23. The low-pressure EGR passage 20 connects the exhaust passage 3, which is on the downstream side of exhaust gas from the exhaust turbine 4, with the intake passage 2 of intake air on the upstream side from the compressor 5. In the present embodiment, the low-pressure EGR passage 20 connects the exhaust passage 3, which is on the downstream side from the DPF 12, with the intake passage 2. The low-pressure EGR valve 21 controls a flow quantity of low-pressure EGR gas passing through the low-pressure EGR passage 20. The low-pressure EGR cooler 22 cools low-pressure EGR gas. The throttle valve 23 controls an opening of the intake passage 2 on the upstream side of intake air from the low-pressure EGR passage 20. The throttle valve 23 controls the intake passage 2 in conjunction with an opening and closing operation of the low-pressure EGR valve 21.

The low-pressure EGR valve 21 and the throttle valve 23 are unitized (integrated) into the valve device 24 as a single component manipulated by a single actuator. The valve device 24 includes the low-pressure EGR valve 21, the throttle valve 23, an electric actuator 25, and a valve angle sensor 26. The electric actuator 25 manipulates the low-pressure EGR valve 21. The valve angle sensor 26 sends an electrical signal according to a rotation angle of the low-pressure EGR valve 21.

The low-pressure EGR valve 21 is a butterfly valve fixed to a shaft 28. The shaft 28 is rotatably supported by a housing, which forms the low-pressure EGR passage 20. The low-pressure EGR valve 21 substantially blocks the low-pressure EGR passage 20 when being in a full close state. The low-pressure EGR valve 21 renders a passage sectional area of the low-pressure EGR passage 20 at the maximum area when being in a full open state.

The full close state and the full open state correspond to a state at a full close position and a state at a full open position in a control range, in which the low-pressure EGR valve 21 is manipulated by the electric actuator 25. The on-control full close position and the on-control full open position are set between a mechanical full close position and a mechanical full open position. Each of the mechanical full close position and the mechanical full open position is defined by a mechanical structure such as a stopper. That is, the mechanical full open position is set on the open side relative to the on-control full open position. When being at the mechanical full open position, the low-pressure EGR valve 21 renders the passage sectional area of the low-pressure EGR passage 20 at the maximum area in a mechanical movable range of the valve.

The electric actuator 25 is, for example, an electric motor and configured to apply a rotational driving force to the shaft 28 via a power transmission mechanism. The electric actuator 25 is supplied with electricity controlled by, for example, an electronic control unit (ECU, not shown).

Figure 2:
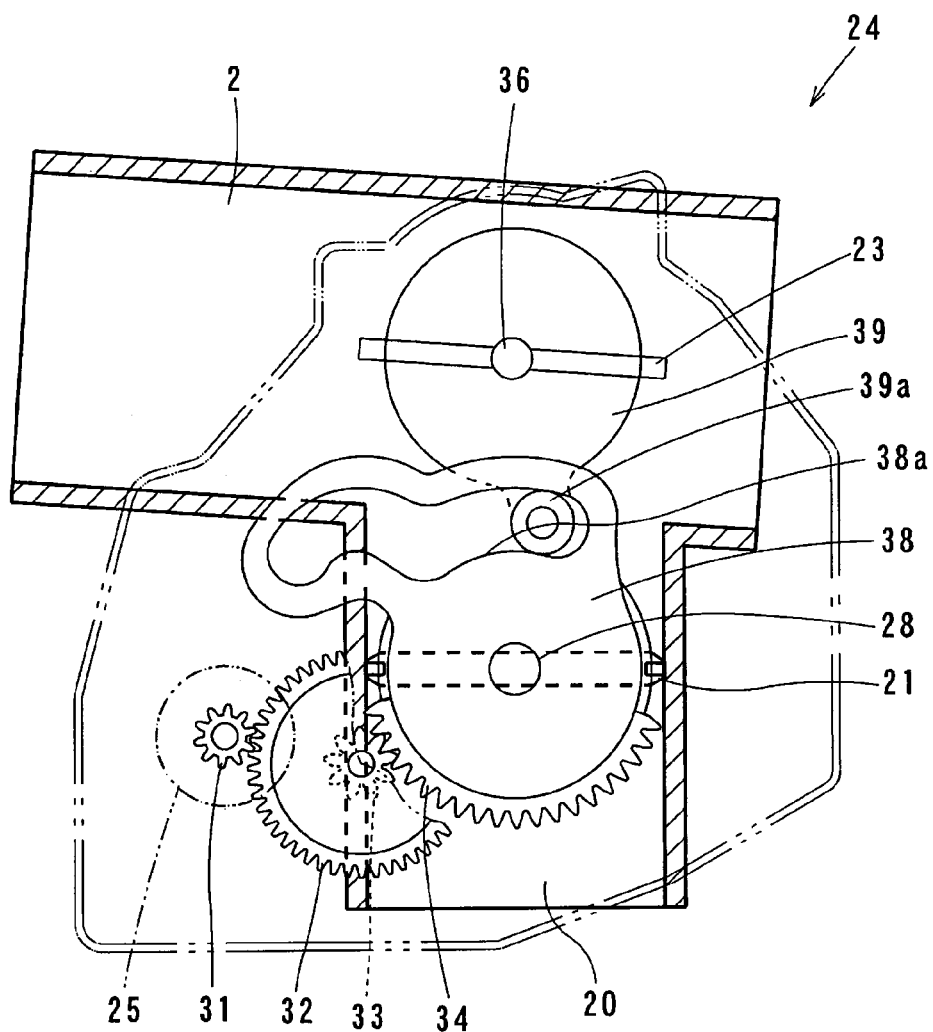
FIG. 2 is a sectional view showing a valve device when a low-pressure EGR valve is in a full close position, according to the embodiment.
Figure 3:
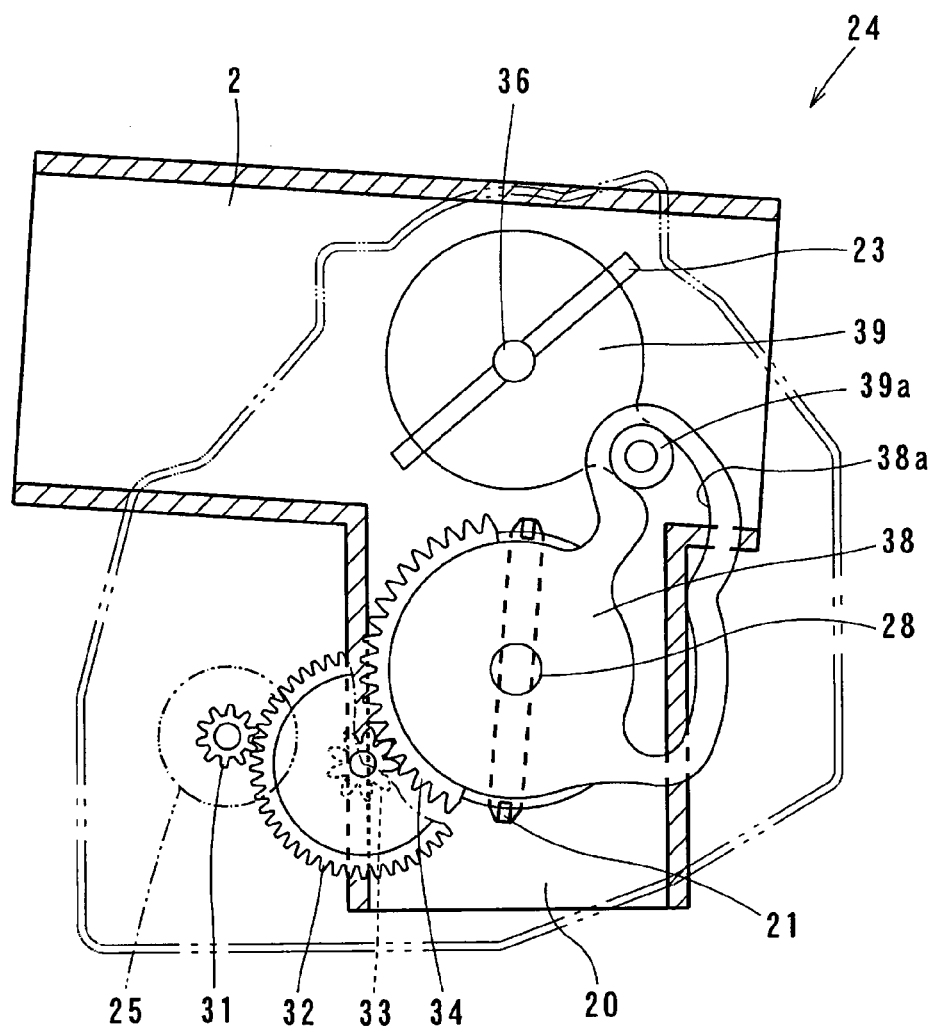
FIG. 3 is a sectional view showing the valve device when the low-pressure EGR valve is in a full open position, according to the embodiment.

As shown in FIGS. 2 and 3, the power transmission mechanism includes a pinion 31, a reduction gear 32, a small-diameter gear 33, and a valve gear 34. The pinion 31 is equipped to an output shaft of the electric motor. The reduction gear 32 meshes with the pinion 31. The small-diameter gear 33 is integrated with the reduction gear 32 and rotatable around a common center axis. The valve gear 34 meshes with the small-diameter gear 33. The valve gear 34 is fixed to the shaft 28 thereby to enable transmission of rotation of the electric motor to the shaft 28.

The valve angle sensor 26 is a rotation angle detection device having a noncontact configuration to detect a rotation angle of the low-pressure EGR valve 21. More specifically, the valve angle sensor 26 includes a pair of magnets and a hall IC. The hall IC is located close to the magnets. The valve angle sensor 26 detects the rotation angle of the low-pressure EGR valve 21 by utilizing an output characteristic of the hall IC, which changes according to rotation of the magnets. The valve angle sensor 26 may employ a noncontact magnetism detection element, such as a single body of a hall element and/or a magnetoresistive element, instead of the hall IC.

Referring back to FIG. 1, the throttle valve 23 is a butterfly valve fixed to a shaft 36. The shaft 36 is rotatably supported by a housing, which forms the intake passage. The throttle valve 23 throttles the intake passage 2 to increase a flow quantity of low-pressure EGR gas. The throttle valve 23 is equipped on an upstream side of intake air from a connection between the low-pressure EGR passage 20 and the intake passage 2. The throttle valve 23 throttles the passage sectional area of the intake passage 2 most when being in a full close state. The throttle valve 23 opens the passage sectional area of the intake passage 2 most when being in a full open state. The throttle valve 23 may be equipped on a downstream side of exhaust gas relative to a connection between the low-pressure EGR passage 20 and the exhaust passage 3. In this case, throttle valve 23 may throttle the exhaust passage 3 to increase a flow quantity of low-pressure EGR gas.

Referring to FIGS. 2 and 3, the shaft 36 of the throttle valve 23 is in parallel with the shaft 28 of the low-pressure EGR valve 21. The shaft 28 and the shaft 36 are connected with each other via a linkage mechanism. The shaft 36 is configured to rotate as the shaft 28 is rotated by the electric motor.

The linkage mechanism includes a driving plate 38 and a driven plate 39. The driving plate 38 rotates integrally with the shaft 28. The driven plate 39 rotates integrally with the shaft 36. The linkage mechanism is formed by engagement between a cam groove 38a, which is formed in the driving plate 38, and a pin 39a, which is equipped to the driven plate 39.

Figure 4:
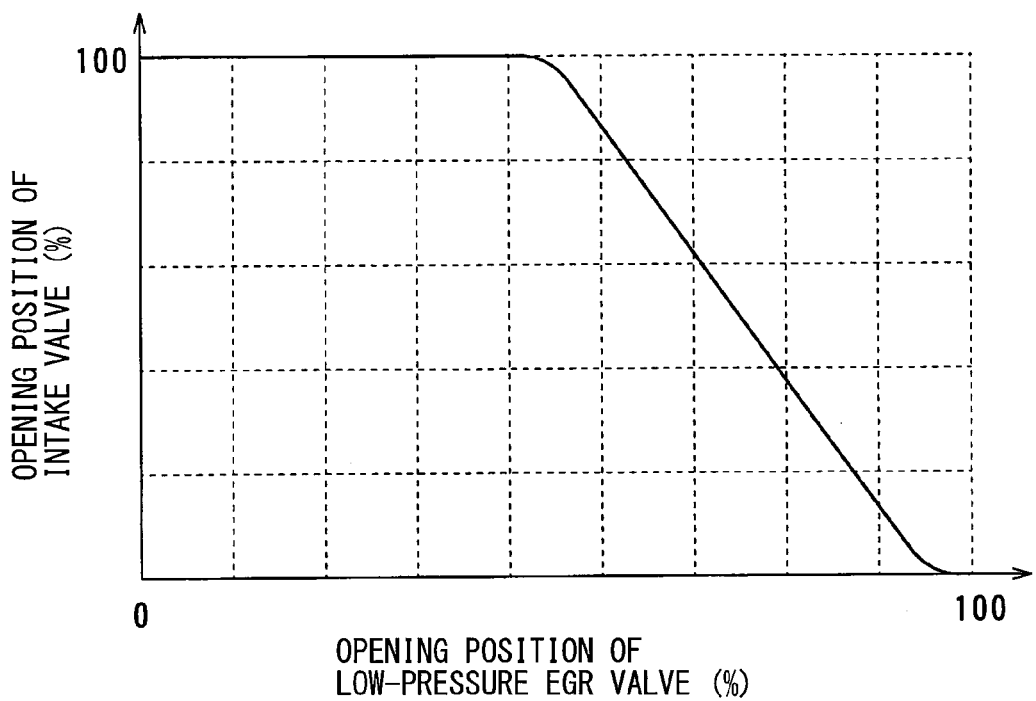
FIG. 4 is a correlation diagram showing a relation between a valve opening position of the low-pressure EGR valve and a valve opening position of an intake valve, according to the embodiment.

The cam groove 38a has a profile, which is defined to enable the following operation. As shown in FIG. 2, when the low-pressure EGR valve 21 is in a full close state, the throttle valve 23 is in a full open state. When an angle of the low-pressure EGR valve 21 becomes a predetermined angle, the throttle valve 23 begins to move in a valve-close direction. As shown in FIG. 3, when the low-pressure EGR valve 21 is in a full open state, the throttle valve 23 is in a full close state. That is, as shown in FIG. 4, a valve opening position of the throttle valve 23 changes non-linearly relative to change in a valve opening position of the low-pressure EGR valve 21.

The ECU includes a microcomputer having a generally known configuration. Specifically, the microcomputer includes a CPU, a storage device, an input circuit, an output circuit, and/or the like. The CPU implements various processings such as a control processing and/or a data processing. The storage device is, for example, a memory device, such as a ROM and/or a RAM configured to store various programs and various data. The input circuit and the output circuit function as an input unit and an output unit, respectively.

The ECU is configured to send a control signal to the electric actuator 25 according to a sensor output, which is sent from the valve angle sensor 26, and a predetermined and prestored correlation between the valve angle and the flow quantity. Thus, the ECU controls the electric actuator 25 to produce a desired flow quantity. More specifically, the ECU receives the sensor output from the valve angle sensor 26. The ECU further generates the control signal, such as an electricity supplied to the electric actuator 25, such that the valve angle, which is detected by the valve angle sensor 26, substantially coincides with a targeted value, which is needed to acquire the desired flow quantity.

(Method for Setting Sensor Output)

The valve angle sensor 26 applies a voltage according to the valve angle. That is, the valve angle sensor 26 has an output characteristic corresponding to a predetermined angle-voltage relation. In mass-production of the valve device 24, it may be desirable to set the output characteristic at the predetermined characteristic (ideal characteristic), such that the output characteristic of the valve angle sensor 26 does not vary among the produced valve devices 24. In view of this, sensor output setting is implemented to conduct an output characteristic adjustment of the valve angle sensor 26. Specifically, the sensor output setting is implemented by using an external instrument (setting device) 40. The setting device 40 is connected with the valve angle sensor 26.

Figure 5:
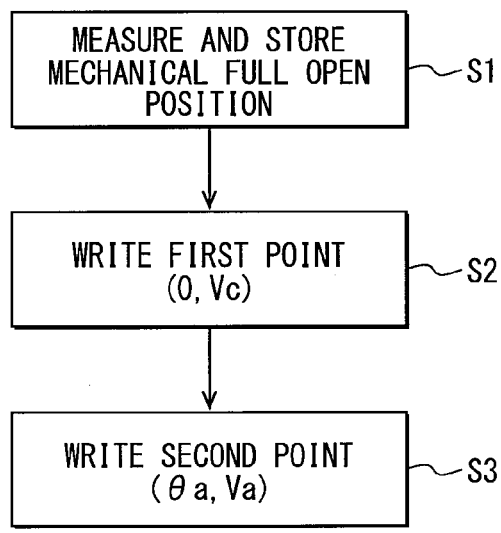
FIG. 5 is a flow chart showing a method for setting a sensor output according to the embodiment.
Figure 6:
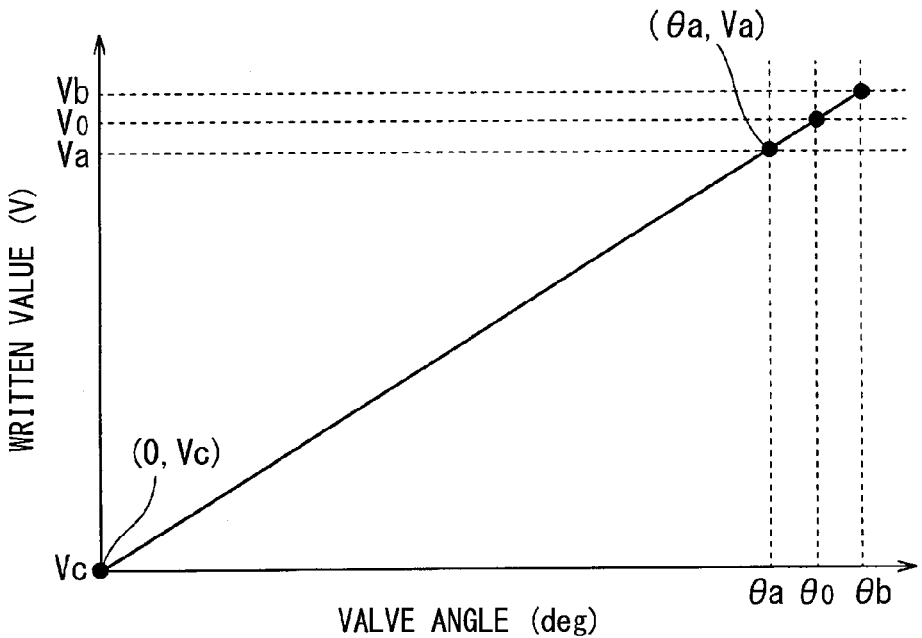
FIG. 6 is a graph for explaining the method for setting the sensor output, according to the embodiment.
Figure 7:
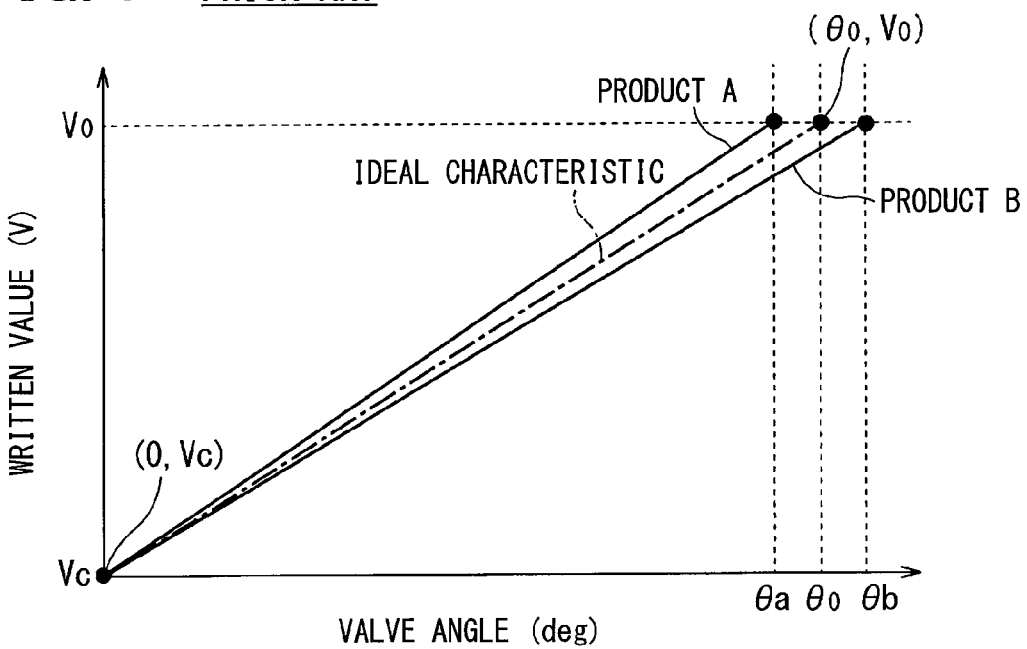
FIG. 7 is a graph for explaining a conventional method for setting a sensor output.

As follows, a method of the sensor output setting according to the present embodiment will be described with reference to FIGS. 5 and 6. First, at S1, an actual measurement value of the valve angle, when being at the mechanical full open position, is stored as an actual full open valve angle. The setting device 40 includes a memory device configured to store the actual full open valve angle. For example, through the sensor output characteristic setting of a product A, it is assumed that the actual measurement value θa of the angle at the mechanical full open position is obtained. In this case, the θa is stored as the actual full open valve angle. It is noted that, the measurement of the mechanical full open position is implemented by a detection device other than the setting device 40. In addition, the measured actual measurement value is sent from the detection device to the setting device 40, and the actual measurement value is stored in the memory device.

Subsequently, at S2, the output value at the mechanical full close position is set. Specifically, a point of (0, Vc) is written in the valve angle sensor 26, such that the valve angle sensor 26 sends a voltage Vc when the valve angle is 0 deg at the mechanical full close position.

Subsequently, at S3, the output value at the actual full open valve angle θ is set. The output value at the actual full open valve angle θ is previously stored at S1. The angle-voltage relation is obtained as an ideal characteristic by implementing linear interpolation between the voltage Vc at the valve angle θ deg and the voltage Vo at the valve angle θo. At S3, the output value at the actual full open valve angle θa is set in compliance with the ideal characteristic. That is, the point at (θa, Va) is written in the valve angle sensor 26, such that the valve angle sensor 26 outputs the voltage Va at the actual full open valve angle θa in compliance with the ideal characteristic.

Through the above-described process, the output characteristic is set at the ideal characteristic. Specifically, the valve angle sensor 26 is set to output the voltage according to an inclination of the angle-voltage relation, which is computable according to the written 2 points. The output characteristic can be similarly set at the ideal characteristic for a product B, which is at an angle θb greater than the angle θo when being at the mechanical full open position.

(Operation Effect)

According to the present embodiment, the method includes a storing process, a first setting process, and a second setting process. In the storing process, the actual measurement value of the valve angle at the mechanical full open position is stored as the actual full open valve angle. In the first setting process, the output value at the mechanical full close position is set. In the second setting process, the output value at the actual full open valve angle is set. The present method enables to set the output characteristic at the ideal characteristic, without influence of a variation in the actual angle at the mechanical full open position. Thus, the method enhances a reliability of the output value from the valve angle sensor 26 to enable control of the valve opening position with high accuracy.

In addition, according to the present embodiment, the valve device 24 includes the throttle valve 23, which is driven in conjunction with the low-pressure EGR valve 21. In a configuration including a driven valve, which is manipulated in conjunction with a driving valve, in a case where a valve opening position control for the driving valve has an error, an error occurs also on the driven valve. In particular, according to the present embodiment, the driven valve is manipulated non-linearly relative to the driving valve. In the configuration of the present embodiment, it is hard to predict how much error occurs on the driving valve. The method of the present embodiment enables to restrict variation in the output characteristic thereby to enable the valve opening position control of the low-pressure EGR valve 21, which is the driving valve, with high accuracy. Therefore, the method also enables the valve opening position control of the throttle valve 23, which is the driven valve, with high accuracy.

(Variation)

In the present embodiment, the output setting for the valve angle sensor, which is for detecting the rotation angle of the low-pressure EGR valve 21, is exemplified. The present disclosure is not limited to the above-exemplified embodiment. The present disclosure may be employed in an output setting for a valve angle sensor, which is for detecting the rotation angle of the throttle valve 10.

The present disclosure relates to the sensor output setting method for setting the output characteristic of the valve angle sensor in the valve device. The valve device includes the valve and the valve angle sensor. The valve controls the opening area in the passage. The valve angle sensor sends the electric signal according to the rotation angle of the valve.

The sensor output setting method includes the storing process, the first setting process, and the second setting process. In the storing process, the actual measurement value of the valve angle at the mechanical full open position is stored as the actual full open valve angle. The mechanical full open position is the full open position in the mechanical configuration. In the first setting process, the output value at the mechanical full close position is set. The mechanical full close position is the full close position in the mechanical configuration. In the second setting process, the output value at the actual full open valve angle, which is stored at the storing process, is set.

The output characteristic is set as the angle to output value relation according to the output value, which is set in the first setting process, and the output value, which is set in the second setting process.

The present method enables to set the output characteristic at the ideal characteristic, without influence of a variation in the actual angle at the mechanical full open position.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A method for setting an output characteristic of a valve angle sensor of a valve device, the valve device including a valve and the valve angle sensor, the valve configured to control an opening in a passage, the valve angle sensor configured to send an electric signal according to a rotation angle of the valve, the method comprising:
   storing, in a storing process, an actual measurement value of a valve angle in a mechanical full open position, which is a full open position in a mechanical configuration, as an actual full open valve angle;
   setting, in a first setting process, an output value in a mechanical full close position, which is a full close position in the mechanical configuration; and
   setting, in a second setting process, an output value at the actual full open valve angle, which is stored in the storing process, wherein
   the output characteristic is set as an angle to output value relation according to the output value, which is set in the first setting process, and the output value, which is set in the second setting process, the method further comprising
   implementing linear interpolation between the output value in the mechanical full close position and an ideal output value when the valve angle is at an ideal valve angle, which is different from the actual measurement value, to obtain the angle to output value relation as an ideal characteristic, wherein
   in the second setting process, the output value is set at the actual full open valve angle on the ideal characteristic.

2. The method according to claim 1, wherein
   the valve device further includes a driven valve, which is rotatable via a linkage mechanism in conjunction with rotation of the valve and configured to control an opening of a passage, which is different from the passage, which the valve controls the opening.

3. The method according to claim 2, wherein
   the valve device is employed in an internal combustion engine, which is equipped with a turbocharger in an intake and exhaust system, the valve is a low-pressure EGR valve configured to receive a part of exhaust gas as low-pressure EGR gas from an exhaust passage, which is downstream from an exhaust turbine of the turbocharger, and to control an opening of a low-pressure EGR passage to reflux the low-pressure EGR gas into the intake passage upstream from a compressor of the turbocharger, and the driven valve is a throttle valve configured to throttle one of the exhaust passage and the intake passage to increase a flow quantity of the low-pressure EGR gas in the low-pressure EGR passage.

4. The method according to claim 2, wherein an opening position of the driven valve is configured to change non-linearly relative to change in an opening position of the valve.

5. The method according to claim 1, further comprising:
obtaining, in an obtaining process, the actual measurement value.

6. The method according to claim 5, further comprising:
the first setting process and the second setting process are implemented by using an external setting device, and
the obtaining process is implemented by a detection device other than the external setting device.

7. The method according to claim 1, wherein
the valve is one of a throttle valve and an EGR valve.

8. A method for setting an output characteristic of a valve angle sensor, the valve angle sensor configured to send an electric signal according to a rotation angle of a valve, the valve rotatable to control an opening in a passage, the method comprising:
storing, as an actual full open valve angle, an actual measurement value of the rotation angle when the valve is in a mechanical full open position, the mechanical full open position being a full open position of the valve in a mechanical configuration of the valve;
first setting a first output value of the valve angle sensor when the valve is in a mechanical full close position, the mechanical full close position being a full close position of the valve in the mechanical configuration; and
second setting a second output value of the valve angle sensor when the valve is at the actual full open valve angle, which is stored, wherein
the output characteristic is set as an angle to output value relation according to the first output value and the second output value, wherein
in the second setting, the second output value is set on a linear characteristic between the first output value and an ideal output value, wherein
the ideal output value is when the valve is at an ideal valve angle, which is different from the actual measurement value.

9. The method according to claim 8, wherein the angle to output value relation represents a relation between
a first point, at which the first output value is set to the valve angle sensor when the valve is in the mechanical full close position, and
a second point, at which the second output value is set to the valve angle sensor when the valve is at the actual full open valve angle.

10. The method according to claim 8, wherein
the valve is one of a throttle valve and an EGR valve.

11. A method for setting an output characteristic of a valve angle sensor of a valve device, the valve device including a valve and the valve angle sensor, the valve configured to control an opening in a passage, the valve angle sensor configured to send an electric signal according to a rotation angle of the valve, the method comprising:
obtaining, in an obtaining process, an actual measurement value of a valve angle in a mechanical full open position, which is a full open position in a mechanical configuration, as an actual full open valve angle;
storing, in a storing process, the actual measurement value;
setting, in a first setting process, a mechanical-full-close output value in a mechanical full close position, which is a full close position in the mechanical configuration; and
setting, in a second setting process, a mechanical-full-open output value at the actual full open valve angle, which is stored in the storing process, on an ideal characteristic, wherein
the ideal characteristic is an angle to output value relation obtained by linear interpolation between the mechanical-full-close output value at the mechanical full close position and an ideal output value when the valve angle is at an ideal valve angle, which is different from the actual measurement value.

12. The method according to claim 11, further comprising:
the first setting process and the second setting process are implemented by using an external setting device, and
the obtaining process is implemented by a detection device other than the external setting device.

13. The method according to claim 11, wherein
the valve is one of a throttle valve and an EGR valve.

* * * * *